United States Patent
Ishihara et al.

(10) Patent No.: US 8,519,817 B2
(45) Date of Patent: Aug. 27, 2013

(54) DISCHARGE GAP FILLING COMPOSITION AND ELECTROSTATIC DISCHARGE PROTECTOR

(75) Inventors: Yoshimitsu Ishihara, Tokyo (JP); Mina Onishi, Tokyo (JP); Yukihiko Azuma, Hachioji (JP); Fumiaki Naka, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/378,735

(22) PCT Filed: Jun. 15, 2010

(86) PCT No.: PCT/JP2010/060070
§ 371 (c)(1),
(2), (4) Date: Dec. 16, 2011

(87) PCT Pub. No.: WO2010/147095
PCT Pub. Date: Dec. 23, 2010

(65) Prior Publication Data
US 2012/0099231 A1   Apr. 26, 2012

(30) Foreign Application Priority Data
Jun. 17, 2009   (JP) ................................ 2009-144134

(51) Int. Cl.
*H01C 7/10*   (2006.01)
(52) U.S. Cl.
USPC ...................................................... 338/22 R
(58) Field of Classification Search
USPC ...................................................... 338/22 R
See application file for complete search history.

(56) References Cited

U.S. PATENT DOCUMENTS

| | | | |
|---|---|---|---|
| 4,726,991 A | | 2/1988 | Hyatt et al. |
| 5,068,634 A | * | 11/1991 | Shrier ............................... 338/21 |
| 5,378,407 A | * | 1/1995 | Chandler et al. .............. 252/513 |
| 6,143,206 A | * | 11/2000 | Handa et al. ................... 252/500 |
| 6,251,513 B1 | | 6/2001 | Rector et al. |
| 6,542,065 B2 | * | 4/2003 | Shrier et al. ..................... 338/21 |
| 7,019,613 B2 | * | 3/2006 | Nihira et al. ................ 338/22 R |
| 7,167,352 B2 | | 1/2007 | Matsuoka et al. |
| 7,220,370 B2 | * | 5/2007 | Yorita et al. ................... 252/500 |
| 7,382,224 B2 | * | 6/2008 | Wang et al. ................. 338/22 R |
| 7,651,636 B2 | * | 1/2010 | Gramespacher et al. ..... 252/500 |
| 7,843,308 B2 | * | 11/2010 | Pachla et al. ..................... 338/21 |
| 2010/0134235 A1 | | 6/2010 | Yoshioka et al. |

FOREIGN PATENT DOCUMENTS

| | | |
|---|---|---|
| JP | 63-100702 A | 5/1988 |
| JP | 2-262301 A | 10/1990 |
| JP | 03-089588 A | 4/1991 |
| JP | 05-067851 A | 3/1993 |
| JP | 10-027668 A | 1/1998 |
| JP | 2001-523040 A | 11/2001 |
| JP | 2002-110405 A | 4/2002 |
| JP | 2005-353845 A | 12/2005 |
| JP | 2007-266479 A | 10/2007 |
| WO | WO 2008/155916 A1 | 12/2008 |

* cited by examiner

*Primary Examiner* — Kyung Lee
(74) *Attorney, Agent, or Firm* — Sughrue Mion, PLLC

(57) ABSTRACT

A discharge gap filling composition which includes metal powders (A) and a binder component (B), wherein surfaces of primary particles of the metal powders (A) are coated with a film composed of a metal oxide, and the primary particles of the metal powders (A) have a flake form. An electrostatic discharge protector is obtained using the composition.

17 Claims, 2 Drawing Sheets

DISCHARGE GAP FILLING COMPOSITION AND ELECTROSTATIC DISCHARGE PROTECTOR

CROSS REFERENCE TO RELATED APPLICATIONS

This application is a National Stage of International Application No. PCT/JP2010/060070 filed on Jun. 15, 2010, which claims priority from Japanese Patent Application No. 2009-144134, filed on Jun. 17, 2009, the contents of all of which are incorporated herein by reference in their entirety.

TECHNICAL FIELD

The present invention relates to a discharge gap filling composition and an electrostatic discharge protector, more specifically an electrostatic discharge protector having excellent operating property at electrostatic discharge and being capable of being produced in a smaller size at a lower cost. The present invention also relates to a discharge gap filling composition used for this electrostatic discharge protector.

TECHNICAL BACKGROUND

When a charged conductive object, e.g., a human body, contacts with or is sufficiently near another conductive object, e.g., an electronic device, intense discharging is generated. This phenomenon is called electrostatic discharge (hereinafter optionally referred to as "ESD"), and can cause problems such as the malfunctioning of or damage to the electronic devices, or can trigger an explosion in an explosive atmosphere.

ESD is a destructive and inevitable phenomenon to which electric systems and integrated circuits are exposed. From an electric viewpoint, ESD is a transient high electric current phenomenon such that a peak current of several amperes continues for 10 n sec and 300 n sec. Unless the occurrence of ESD is followed by the conduction of the electric current of several amperes to the outside of the integrated circuit within several ten nano sec, the integrated circuit suffers from unrepairable damage, or cause failure or deterioration, failing to work normally.

Recent rapid tendency of electronic parts and electronic devices toward their smaller weight, smaller thickness, and smaller size has brought about remarkable increase in the integration degree of semiconductors and the packaging density of electronic parts in printed wiring boards, so that electronic elements and signal lines, which are densely integrated or mounted, are very closely present among each other. Further, the rate of signal processing has been accelerated. Consequently, high-frequency radiation noise is easily induced. Under these circumstances, the development has been underway of an electrostatic discharge protection element for protecting IC and the like in circuits from ESD.

A conventional example of an electrostatic protection element for protecting IC and the like in circuits from ESD is an element having a bulk structure which element comprises a sintered substance composed of a metal oxide or the like (for example, Patent document 1). This element is a laminated chip varistor composed of a sintered substance and is equipped with a laminate and a pair of external electrodes. The varistor has excellent inhibitive power against electrostatic discharge, causing, upon an applied voltage reaching a certain value or more, a current that has not flown until then to flow quickly. However, the laminated chip varistor which is a sintered substance cannot be produced without relying on a complicated process comprising sheet molding, internal electrode printing, and sheet lamination, and moreover has failures such as easy occurrence of interlayer delamination during a mounting step.

A further example of the electrostatic protection element for protecting IC and the like in circuits from ESD is a discharge type element. The discharge type element is advantageous because of having a small leaked current, being simple in principle and being unlikely to have breakdown. Moreover, a discharge voltage can be controlled from the distance of a discharge gap. When the discharge type element has a sealing structure, the distance of the discharge gap can be determined according to the pressure of a gas and the type of a gas. Commercially available discharge type elements include those obtainable by glass tube sealing a discharge gap which is provided using laser or the like on a conductor film formed on a cylindrical ceramic surface. These commercially available glass tube sealed discharge gap elements have excellent electrostatic discharge properties, but the complicated form thereof has size limitation preventing the provision of a small sized surface mounting element and makes the cost reduction difficult.

Moreover, forming the discharge gap directly on a wiring and then adjusting the distance of the discharge gap to control a discharge voltage has been disclosed (for example, Patent documents 2 to 4). For example, Patent document 2 discloses the distance of the discharge gap as being 4 mm, and Patent document 3 discloses the distance of the discharge gap as being 0.15 mm. Patent document 4 discloses the discharge gap as being preferably 5 to 60 μm in order to protect general electronic elements, and discloses the discharge gap as being preferably 1 to 30 μm in order to protect IC or LSI sensitive to static electricity, and the discharge gap is disclosed therein as being able to be increased to about 150 μm in an application requiring the removal of a large pulse voltage part alone.

Still, without any protection of the discharge gap part, the application at a high voltage may cause aerial discharge and contamination of conductor surface due to moisture and gases in environment, possibly changing the discharge voltage and causing short circuit of the electrodes due to the carbonization of a base material on which electrodes are provided.

On the other hand, the electrostatic discharge protector having a discharge gap needs to have high insulating resistance at a normal operating voltage, e.g., at a voltage of, usually, less than DC10V. For this need, the provision of a voltage-resistant insulating member in the discharge gap of a pair of electrodes is effective. In order to protect the discharge gap, filling the discharge gap directly with a resist as such an insulating member is not practical, significantly increasing a discharge voltage; and filling a narrow discharge gap having a very narrow width of about 1 to 2 μm or less with a usual resist, although being capable of decreasing the discharge voltage, cause problems such as minute deterioration of the filled resist and the decrease in insulating resistance, which possibly causes conduction.

Patent document 5 discloses a protective element containing a discharge gap having a width of 10 to 50 μm provided on an insulating base material and a functional film containing ZnO as a main component and silicon carbide provided between a pair of electrode patterns which ends face each other. As compared with the laminated chip varistor, such a protective element advantageously has a simple structure and is capable of being produced as a thick film element on the base material.

While these elements taking measures against ESD have aimed for the decrease in a mounting area according to the development of electronic devices, their forms are still elements, which need to be mounted on a wiring base material using solder or the like. This reduces the freedom degree of designing in electronic devices and prevents further reduction of sizes such as a height.

In view of this, instead of fixing the elements, taking measures against ESD in necessary places and necessary areas with a free form including size reduction has been desired.

Meanwhile, the use of a resin composition as a protective material from ESD has been disclosed (for example, Patent document 6). This resin composition comprises a main component composed of an insulating binder mixture, conductive particles having an average particle diameter of less than 10 μm and semiconductor particles having an average particle diameter of less than 10 μm.

A further disclosed example of the protective material from ESD is a composition material containing a mixture of conductive particles and semiconductor particles which are surface-coated with an insulating oxide film, the particles being bonded with an insulating binder; a composition material having a defined particle diameter range; and a composition material having a defined surface distance between conductive particles (for example, Patent document 7).

A process described in Patent document 7, however, does not optimize a method of dispersing the conductive particles and semiconductor particles, and thus has a technically unstable factor such as a failure to obtain a high electric resistance value at low voltage or a failure to obtain a low electric resistance value at high voltage.

These compositions have high operating voltage at electrostatic discharge, and thus are unsuitable particularly for protecting low-resistant elements. They have a problem that semiconductor particles and insulating particles, particularly if blended in large amount, decreases the operating property, and that the metal particles, if blended alone, decreases high voltage resistance.

CITATION LIST

Patent Documents

Patent document 1: JP-A-2005-353845
Patent document 2: JP-A-H03-89588
Patent document 3: JP-A-H05-67851
Patent document 4: JP-A-H10-27668
Patent document 5: JP-A-2007-266479
Patent document 6: JP-A-2001-523040
Patent document 7: U.S. Pat. No. 4,726,991

SUMMARY OF THE PRESENT INVENTION

Problem to be Solved by the Invention

The present invention is intended to solve the above problems, and it is an object of the present invention to provide an electrostatic discharge protector being capable of simply taking measures against ESD with a free form in variously designed electronic devices such as electronic circuit boards, having excellent operating property at electrostatic discharge, and being capable of being produced in a smaller size at a lower cost. It is another object of the present invention to provide a discharge gap filling composition employable for the production of such an electrostatic discharge protector.

Means for Solving the Problem

The present inventors have earnestly studied in order to solve the above problems in conventional techniques, and found that by using a discharge gap filling composition comprising metal powders (A) and a binder component (B), wherein surfaces of primary particles of the metal powders (A) are coated with a film composed of a metal oxide, and the primary particles of the metal powders (A) have a flake form, an electrostatic discharge protector having excellent operating property at electrostatic discharge and being capable of being produced in a smaller size at a lower cost can be obtained.

That is to say, the present invention relates to the following subjects.

[1] A discharge gap filling composition comprising metal powders (A) and a binder component (B), wherein surfaces of primary particles of the metal powders (A) are coated with a film composed of a metal oxide, and the primary particles of the metal powders (A) have a flake form.

[2] The discharge gap filling composition according to [1], wherein the metal oxide is a hydrolyzed product of a metal alkoxide represented by the following general formula (1).

[Chem. 1]

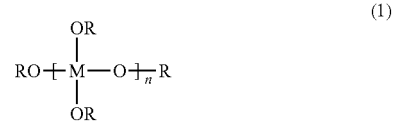

In the formula (1), M is a metal atom, O is an oxygen atom, R are each independently an alkyl group of 1 to 20 carbon atoms, and n is an integer of 1 to 40.

[3] The discharge gap filling composition according to [2], wherein M in the general formula (1) is silicon, titanium, zirconium, tantalum or hafnium.

[4] The discharge gap filling composition according to any one of [1] to [3], further comprising a layered substance (C).

[5] The discharge gap filling composition according to [1] or [4], wherein the film composed of a metal oxide is a self oxide film formed from the primary particles per se of the metal powders (A).

[6] The discharge gap filling composition according to any one of [1] to [5], wherein a metal element of the metal powders (A) is manganese, niobium, zirconium, hafnium, tantalum, molybdenum, vanadium, nickel, cobalt, chromium, magnesium, titanium or aluminum.

[7] The discharge gap filling composition according to any one of [4] to [6], wherein the layered substance (C) is at least one selected from the group consisting of a layered clay mineral (C1) and a layered carbon (C2).

[8] The discharge gap filling composition according to any one of [4] to [7], wherein the layered substance (C) is a layered carbon (C2).

[9] The discharge gap filling composition according to [8], wherein the layered carbon (C2) is at least one selected from the group consisting of carbon nanotube, gas phase grown carbon fiber, carbon fullerene, graphite and a carbyne carbon.

[10] The discharge gap filling composition according to any one of [1] to [9], wherein the binder component (B) comprises a thermosetting compound or an active energy curable compound.

[11] The discharge gap filling composition according to any one of [1] to [10], wherein the binder component (B) comprises a thermosetting urethane resin.

[12] An electrostatic discharge protector comprising at least two electrodes, a discharge gap formed between the two electrodes, the electrostatic discharge protector further comprising a discharge gap filling member formed by filling the discharge gap with the discharge gap filling composition according to any one of [1] to [11].

[13] The electrostatic discharge protector according to [12], wherein the discharge gap has a distance of 5 to 300 μm.

[14] The electrostatic discharge protector according to [12] or [13], wherein a protective layer is formed on a surface of the discharge gap filling member.

[15] An electronic circuit board comprising the electrostatic discharge protector according to any one of [12] to [14].

[16] A flexible electronic circuit board comprising the electrostatic discharge protector according to any one of [12] to [14].

[17] An electronic device comprising the electronic circuit board according to [15] or the flexible electronic circuit board according to [16].

Effect of the Present Invention

The use of the discharge gap filling composition of the present invention can produce a small size electrostatic discharge protector having excellent operating property at electrostatic discharge at a lower cost and readily realize protection from electrostatic discharge.

Moreover, the use of the discharge gap filling composition of the present invention can regulate the operating voltage by setting the discharge gap at a specific distance, thereby being capable of providing an electrostatic discharge protector having excellent accuracy of regulating the operating voltage.

The electrostatic discharge protector of the present invention can be formed easily with a free form, by forming a discharge gap between necessary electrodes according to a necessary operating voltage, filling the discharge gap with the discharge gap filling composition and solidifying or curing. On this account, the electrostatic discharge protector of the present invention can be suitably used for digital devices including cellular phones and devices such as mobile devices that are frequently touched by human hands leading to easy charging of static electricity.

EMBODIMENT FOR CARRYING OUT THE INVENTION

Figure 1:
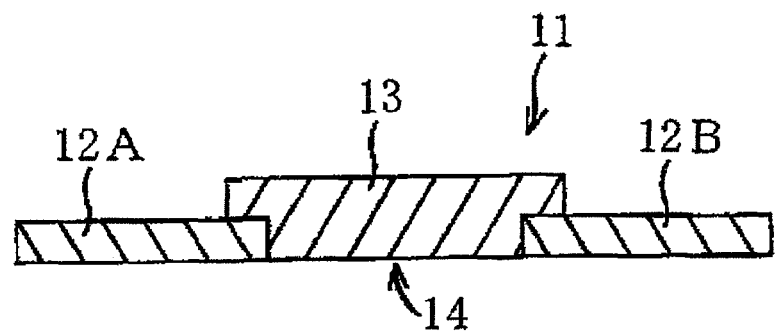
FIG. 1 is a vertical section of an electrostatic discharge protector 11, which is one embodiment of the electrostatic discharge protector according to the present invention.

The present invention will be described in detail below.
<Discharge Gap Filling Composition>

The discharge gap filling composition of the present invention is a composition comprising metal powders (A) and a binder component (B), wherein surfaces of primary particles of the metal powders (A) are coated with a film composed of a metal oxide, and the primary particles of the metal powders (A) have a flake form.

In the present invention, the discharge gap refers to a space formed between a pair of electrodes, and the discharge gap filling composition refers to a composition to fill the above discharge gap.

Metal Powders (A)

In the metal powders (A) used in the present invention, the surfaces of the primary particles are coated with a film composed of a metal oxide. The primary particles as used herein refer to the smallest particles constituting the powders, and is a word used in contrast with words such as secondary particles formed by the aggregation of the primary particles.

The surfaces of the primary particles of the metal powders (A) are coated with the film composed of a metal oxide, and thus the metal powders (A) partially have proper insulating property and high voltage resistance. A discharge gap filling composition comprising such metal powders (A) has insulating property at a normal operating voltage, but has conductive property at high voltage loading at electrostatic discharge. It is thus considered that an electrostatic discharge protector using such a discharge gap filling composition exerts effective protection properties from electrostatic discharge and hardly receives breakage at a high voltage.

The film composed of a metal oxide is not particularly limited as long as achieving the object of the present invention, but examples thereof include a film composed of a hydrolyzed product of a metal alkoxide, and an oxide film formed from the primary particles per se of the metal powders (A) (hereinafter, also referred to "self oxide film").

A metal atom constituting the metal alkoxide is not particularly limited as long as being capable of reacting with water singly or with water and a hydrolyzing catalyst to form a hydrolyzed product. In the present invention, the metal atoms include semimetals such as silicon, germanium and tin. Preferable examples of the metal atoms are magnesium, aluminum, gallium, indium, thallium, silicon, germanium, tin, titanium, zirconium, hafnium, tantalum and niobium. Among them, silicon, titanium, zirconium, tantalum and hafnium are further preferred, and silicon is particularly preferred.

A silicon alkoxide is hardly hydrolyzed by moisture in the air, and the hydrolyzing rate can be easily controlled. This nature of silicon alkoxide tends to increase production stability in coating the surfaces of the primary particles of the metal powders (A) with a film composed of a hydrolyzed product of the silicon alkoxide.

The metal alkoxide is preferably represented by the following general formula (1). Such a metal alkoxide tends to facilitate the formation of the film composed of a metal oxide in hydrolysis.

[Chem. 2]

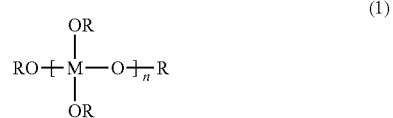

(1)

In the general formula (1), M is a metal atom, O is an oxygen atom, R are each independently an alkyl group having 1 to 20 carbon atoms, n is an integer of 1 to 40.

M in the general formula (1) is preferably silicon, titanium, zirconium, tantalum or hafnium. When M is such a metal element, the final electrostatic discharge protector tends to have a good voltage resistance.

In the general formula (1), R is an alkyl group having 1 to 20 carbon atoms, preferably an alkyl group having 1 to 12 carbon atoms. Examples of such an alkyl group are methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl and n-dodecyl. Among these, preferable examples are methyl, ethyl, n-propyl, isopropyl, n-butyl, sec-butyl, isobutyl and n-pentyl. More preferable examples are ethyl, n-propyl and n-butyl.

If the alkyl group has a large molecular weight, the hydrolysis of the metal alkoxide represented by the general formula (1) becomes moderate. If the alkyl group has a too large molecular weight, the metal alkoxide represented by the general formula (1) becomes in a wax state and tends to be difficult to disperse uniformly.

In the metal alkoxide represented by the general formula (1), if the number n is too large, the viscosity of the metal alkoxide itself is increased and the metal alkoxide is difficult to disperse. In view of this, n is preferably an integer of 1 to 4. In particular, the use of a monomer (n=1 in the general formula (1)) may cause rapid reaction and may generate many suspended particles, and thus it is desired to use a condensate such as a dimer (n=2 in the general formula (1)), a trimer (n=3 in the general formula (1)) and a tetramer (n=4 in the general formula (1)).

Examples of the metal alkoxide used in the present invention are tetramethoxy silane, tetraethoxy silane, tetraethyl titanate, tetraisopropyl titanate, tetra-n-butyl titanate, tetra-sec-butyl titanate, tetra-tert-butyl titanate, tetra-2ethylhexyl titanate, tetraethyl zirconate, tetraisopropyl zirconate, tetra-n-butyl zirconate, tetra-sec-butyl zirconate, tetra-tert-butyl zirconate, tetra-2ethylhexyl zirconate and condensates thereof. Particularly, tetraethoxy silane is preferred in terms of hydrolyzing properties and dispersibility. These metal alkoxides may be used singly or two or more may be mixed for use.

The surfaces of the primary particles of the metal powders (A) can be coated with the hydrolyzed product of the metal alkoxide, for example, by gradually adding the metal alkoxide and water in more amount than being capable of hydrolyzing the metal alkoxide to a solvent in which the metal powders (A) are suspended. By this method, a hydrolyzed product including a metal oxide is generated from the metal alkoxide, and such a hydrolyzed product can coat the surfaces of the primary particles of the metal powders (A).

In the metal alkoxide represented by the general formula (1), it is considered that when M is silicon, for example, the hydrolysis generates silicon dioxide, an oligomer and a polymer resulting from the dehydration and condensation of silanol, and their mixtures, and a film composed of the metal oxide including the silicon dioxide coats the surfaces of the primary particles of the metal powders (A).

To add the metal alkoxide and water, they may be inclusively added, or they may be added by small amounts through several steps. With regard to the addition order, the metal alkoxide may be previously dissolved or suspended in a solvent followed by the addition of water; or water may be previously dissolved or suspended in a solvent followed by the addition of the metal alkoxide; or small amounts of the metal alkoxide and water may be added to a solvent alternately. However, in view of the tendency that performing reaction moderately generates smaller amount of suspended particles, preferable is the method in which the metal alkoxide and water are added by small amounts through several steps, the method optionally involving the dilution with a solvent to decrease the concentration.

Preferable examples of the solvent are those capable of dissolving the metal alkoxide, such as alcohols, mineral spirit, solvent naphtha, benzene, toluene, xylene, petroleum benzene and ethers, but are not limited particularly because they react in a suspended state. Furthermore, they may be used singly or in a mixture of two or more kinds. Moreover, the alcohols can be used as polymerization rate regulating agent, because the alcohols are by-produced by the addition of water in the hydrolysis reaction of the metal alkoxide.

The film composed of a metal oxide may be the self oxide film formed from the primary particles per se of the metal powders (A). In the present invention, the self oxide film refers to an oxide film formed from the primary particles per se of the metal powders (A).

The metal powers (A) in which the primary particles are coated with the self oxide film have insulating property at a normal operating voltage because the oxide film has insulating property, but is considered to have conducting property at a high voltage load at electrostatic discharge and then recover the insulating property upon the release of the high voltage. It is therefore considered that an electrostatic discharge protector using a discharge gap filling composition comprising such metal powers (A) in which the primary particles are coated with the self oxide film exerts effective protection properties from electrostatic discharge and hardly receives breakage at a high voltage.

As the metal powders (A) used in the present invention, general known metal powders can be used, but preferable are those capable of protecting their insides by forming minute oxide films on the surfaces of the primary particles in spite of having a high ionizing tendency, namely, capable of being in a passive state. Examples of metal elements of such metal powders are manganese, niobium, zirconium, hafnium, tantalum, molybdenum, vanadium, nickel, cobalt, chromium, magnesium, titanium and aluminum. Among these, most preferable examples are aluminum, nickel, tantalum and titanium because they are available easily and inexpensively.

As the metal powders, moreover, powders composed of vanadium oxide used for a thermister which resistance value quickly changes at a specific temperature is effectively employable.

The metal powders can be used singly or two or more kinds can be mixed for use.

The self oxide film can be formed on the surfaces of the primary particles of the metal powders, for example, by heating the metal powders in the presence of oxygen so as to form the self oxide film, but the following method can prepare an oxide film having a more stable structure: specifically, the surfaces of the primary particles of the metal powders are cleaned using an organic solvent such as acetone, and slightly etched with diluted hydrochloric acid, and then, the resultant surfaces of the primary particles of the metal powders are heated in an atmosphere of a mixed gas of 20% of hydrogen gas and 80% of argon gas at a temperature lower than the melting point of the metal powders themselves, e.g., at 750° C. for the metals other than aluminum, at 600° C. for aluminum, for about 1 hr and further heated at an atmosphere of high purity oxygen for 30 min, whereby the uniform self oxide films can be formed on the surfaces of the primary particles of the metal powders with high controllability and good reproducibility. This method tend to prevent the unevenness in one device or between devices of the breakdown voltage of the self oxide film formed on the surfaces of the primary particles of the metal powders.

In the method for coating the surfaces of the primary particles of the metal powders (A) with the film composed of the metal oxide, the thickness of the coating film can be about 10 nm to 2 μm. The thickness of the coating film can be measured, for example, using a transmission electron microscope. With regard to a coating region, the surfaces of the primary particles of the metal powders (A) may be partially coated with the film composed of the metal oxide, but in a preferable embodiment, entire surfaces of the particles are coated with the film composed of the metal oxide.

Furthermore, the individual primary particles may not be coated with the film composed of the metal oxide, when spaces between the individual particles are filled with the film composed of the metal oxide.

By coating the surfaces of the primary particles with the film composed of the metal oxide, the metal powders (A) show proper insulating property on their surfaces, and thus the overlapping of the particles with one another is not a problem. However, if the proportion of the binder component (B) is small, a problem may occur such as powder falling. In view of this, in consideration of practicability rather than operating property, the mass occupancy of the metal powders (A) wherein the surfaces of the primary particles are coated with the film composed of the metal oxide is desirably not more than 95% by mass in the solid components of the discharge gap filling composition.

At the time of ESD occurrence, the electrostatic discharge protector as a whole needs to show conducting property, and thus the mass occupancy as mentioned above has a preferable minimum. That is, the mass occupancy of the metal powders (A) wherein the surfaces of the primary particles are coated with the film composed of the metal oxide is desirably not less than 30% by mass in the solid components of the discharge gap filling composition.

Thus, when the discharge gap filling composition of the present invention is used for the electrostatic discharge protector, the mass occupancy of the metal powders (A) wherein the surfaces of the primary particles are coated with the film composed of the metal oxide is preferably 30% by mass to 95% by mass, more preferably 50% by mass to 95% by mass, still more preferably 60% by mass to 95% by mass, in the solid components of the discharge gap filling composition.

The form of the primary particles of the metal powders (A) is a flake form.

In the present invention, the flake form refers to a form having both a low thickness and a surface continuity, with examples thereof including a scale form, a disk form, a strip form and a layer form, but not including forms such as spherical form. Specifically, the thickness and the surface of the primary particle of the metal powders (A) are such that the longest length in a longitudinal direction of the surface is twice or more of the average thickness, and the longest length in a transversal direction of the surface is twice or more of the average thickness. The upper limit of the longest length in a longitudinal direction of the surface is not particularly limited, but is not more than 1000 times of the average thickness. The upper limit of the longest length in a transversal direction of the surface is not particularly limited, but is not more than 1000 times of the average thickness.

It is preferable that the above applies also with regard to primary particles of the metal powders which have not been coated with the metal oxide. It is preferable that the same is true also with regard to an average thickness (d) and an average aspect ratio (L/d), described later.

In the discharge gap filling composition of the present invention, the form of the primary particles of the metal powders (A) is a flake, whereby an electrostatic discharge protector using such a discharge gap filling composition tends to have good operating property at electrostatic discharge. In order for the primary particles of the metal powders (A) to have a flake form, it is preferable that the primary particles of the metal powders which have not been coated with the metal oxide, too, have a flake form.

As the primary particles of the metal powders (A), those having an average thickness (d) of not more than 1 μm can be used, preferably not more than 0.5 μm, most preferably not more than 0.3 μm.

The primary particles of the metal powders (A) have an average aspect ratio (L/d) of 3 to 1000, preferably 5 to 500, more preferably 10 to 100.

In the discharge gap filling composition of the present invention, when the primary particles of the metal powders (A) have an average aspect ratio (L/d) within the above range, smooth discharge in the discharge direction is readily achieved. As a result, an electrostatic discharge protector using such a discharge gap filling composition has good operating voltage and high voltage resistance. That is, it is considered that the protector has good operating property and shows properties for dealing with electrostatic discharge of a lower voltage, too.

The "aspect ratio (L/d)" as used herein refers to the ratio (L/d) of a long axis to a short axis, wherein in the primary particles of the metal powders (A), the length of the longest axis (long side) is defined as "L" and the length of the shortest axis corresponding thereto is defined as "d".

The average aspect ratio (L/d) of the primary particles of the metal powders (A) is measured as follows. Cross sections of the metal powders (A) are observed with a scanning electron microscope at a magnification of 5000 to 30000, and then among primary particles observed of the metal powders (A), ten primary particles are arbitrarily selected, and in each of the primary particles selected, the length of the longest axis (long side): "L" and the length of the shortest axis corresponding thereto: "d" are measured. From average values of these L and d, the average aspect ratio (L/d) can be measured.

Binder Component (B)

In the present invention, the binder component (B) is an insulating substance for dispersing the metal powders (A) as described above and the layered substance (C) as described later. Examples of the binder component (B) are organic polymers, inorganic polymers and composite polymers thereof.

Examples of the binder component (B) are a polysiloxane compound, a urethane resin, a polyimide, a polyolefin, a polybutadiene, an epoxy resin, a phenol resin, an acryl resin, a hydrogenated polybutadiene, a polyester, a polycarbonate, a polyether, a polysulfone, a polytetrafluororesin, a melamine resin, a polyamide, a polyamide imide, a phenol resin, an unsaturated polyester resin, a vinyl ester resin, an alkyd resin, a vinylester resin, an alkyd resin, a diallylphthalate resin, an allylester resin and a furane resin.

The binder component (B) preferably contains a thermosetting compound or an active energy curable compound from the viewpoints of mechanical stability, thermal stability, chemical stability or stability with time. Among the thermosetting compound, a thermosetting urethane resin is particularly preferred because of having a high insulating resistance value, good adhesion with a base material and good dispersibility of the metal powders (A) wherein the surfaces of the primary particles are coated.

These binder components (B) may be used singly or two or more may be combined for use.

Examples of the thermosetting urethane resin are polymers having a urethane linkage formed by allowing a polyol compound containing a carbonate diol compound to react with an isocyanate compound. In terms of allowing the resin to have the function of curing reaction with other curing components, preferable examples are a carboxyl-group-containing thermosetting urethane resin having a carboxyl group in its molecule and an acid-anhydride-group-containing thermosetting urethane resin having an acid anhydride group in its molecular end. Examples of the above other curing components include an epoxy resin curing agent, which can be used as one of the binder components (B).

Examples of the carbonate diol compound are a carbonate diol compound having a repeating unit derived from one or two or more straight chain aliphatic diols as a constituting unit, a carbonate diol compound having a repeating unit derived from one or two or more alicyclic diols as a constituting unit, and a carbonate diol compound having a repeating unit derived from both of the above diols as a constituting unit.

Examples of the carbonate diol compound having a repeating unit derived from the straight chain aliphatic diol as a constituting unit include polycarbonate diols having a structure of bonding, with a carbonate linkage, a diol component such as 1,3-propane diol, 1,4-butane diol, 1,5-pentane diol, 1,6-hexane diol, 3-methyl-1,5-pentane diol, 2-methyl-1,8-octane diol and 1,9-nonane diol.

Examples of the carbonate diol compound having a repeating unit derived from the alicyclic diol as a constituting unit include polycarbonate diols having a structure of bonding, with a carbonate linkage, a diol component such as 1,4-cyclohexane dimethanol, 1,3-cyclohexane dimethanol, 1,4-cyclohexane diol, 1,3-cyclohexane diol, tricyclohexane dimethanol and pentacyclopentadecane dimethanol. Two or more of these diol components may be combined.

Commercially available examples of the carbonate diol compounds are Product names PLACCEL, CD-205, 205PL, 205HL, 210, 210PL, 210HL, 220, 220PL and 220HL manufactured by Daicel Chemical Industries, Ltd.; Product names UC-CARB100, UM-CARB90 and UH-CARB100 manufactured by Ube Industries Ltd.; and Product names C-1065N, C-2015N, C-1015N and C-2065N manufactured by Kuraray Co., Ltd.

These carbonate diol compounds may be used singly or two or more may be combined for use. Among these, in particular, the polycarbonate diol having a repeating unit derived from the straight chain aliphatic diol as a constituting unit tends to have low warpage properties and excellent flexibility. Thus, the use of the binder component (B) comprising such polycarbonate diols facilitates the provision of an electrostatic discharge protector, described later, on a flexible wiring board.

The polycarbonate diol having a repeating unit derived from the alicyclic diol as a constituting unit tends to have higher crystallinity and excellent heat resistance. From the above viewpoints, it is preferred to use two or more of these polycarbonate diols in combination, or to use a polycarbonate diol containing both of the repeating units derived from the straight chain aliphatic diol and the alicyclic diol as constituting units. In order to exhibit well-balanced flexibility and heat resistance, it is preferred to use a polycarbonate diol having a copolymerization mass ratio between the straight chain aliphatic diol and the alicyclic diol of 3:7 to 7:3.

The carbonate diol compound has a number average molecular weight of preferably not more than 5000. If the number average molecular weight is over 5000, the relative amount of the urethane linkage decreases, whereby the electrostatic discharge protector may have increased operating voltage or decreased high voltage resistance.

Examples of the isocyanate compound are 2,4-toluene diisocyanate, 2,6-toluene diisocyanate, isophorone diisocyanate, hexamethylene diisocyanate, diphenylmethylene diisocyanate, (o, m or p)-xylene diisocyanate, (o, m or p)-hydrogenated xylene diisocyanate, methylenebis(cyclohexyl isocyanate), trimethylhexamethylene diisocyanate, cyclohexane-1,3-dimethylene diisocyanate, cyclohexane-1,4-dimethylene diisocyanate, 1,3-trimethylene diisocyanate, 1,4-tetramethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, 2,2'-diethylether diisocyanate, cyclohexane-1,4-dimethylene diisocyanate, 1,5-naphthalene diisocyanate, p-phenylene diisocyanate, 3,3'-methylene ditolylene-4,4'-diisocyanate, 4,4'-diphenylether diisocyanate, tetrachlorophenylene diisocyanate, norbornane diisocyanate, and 1,5-naphthalene diisocyanate. These isocyanate compounds may be used singly or two or more may be combined for use.

Among them, it is preferred to use alicyclic diisocyanates derived from alicyclic diamine such as isophorone diisocyanate or (o, m or p)-hydrogenated xylene diisocyanate. When using these diisocyanates, a cured product having excellent high voltage resistance can be prepared.

To prepare the carboxyl-group-containing thermosetting urethane resin as the thermosetting urethane resin of the present invention, for example, a carboxyl-group-having polyol is reacted with the carbonate diol compound and the isocyanate compound.

As the carboxyl-group-having polyol, it is preferred to use a carboxyl-group-having dihydroxy aliphatic carboxylic acid. Examples of such a dihydroxyl compound are dimethylol propionic acid and dimethylol butanoic acid. When using the carboxyl-group-having dihydroxy aliphatic carboxylic acid, a carboxyl group can be easily present in the urethane resin.

To prepare the acid-anhydride-group-containing thermosetting urethane resin as the thermosetting urethane resin used in the present invention, for example, the carbonate diol compound is allowed to react with the isocyanate compound in a ratio of the number of isocyanate group to the number of hydroxyl group, isocyanate group/hydroxyl group=not less than 1.01, to thereby prepare a second diisocyanate compound, and then the second diisocyanate compound is allowed to react with an acid-anhydride-group-having polycarboxylic acid or its derivative.

Examples of the acid-anhydride group-having polycarboxylic acid or its derivative are an acid-anhydride-group-having trivalent polycarboxylic acid and its derivative, and an acid-anhydride-group-having tetravalent polycarboxylic acid.

Examples of the acid-anhydride-group-having trivalent polycarboxylic acid and its derivative, not particularly limited include compounds represented by the following formulas (2) and (3).

[Chem. 3]

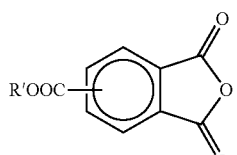

(2)

[Chem. 4]

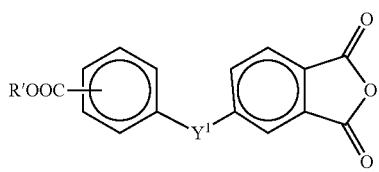

(3)

In the formulas, R' is hydrogen, an alkyl group of 1 to 10 carbon atoms, or a phenyl group; and $Y^1$ is —$CH_2$—, —CO—, —$SO_2$— or —O—.

As the acid-anhydride-group-having trivalent polycarboxylic acid and its derivative, trimellitic acid anhydride is particularly preferred from the viewpoints such as heat resistance and cost.

In addition to the above polycarboxylic acids and their derivatives, it is possible to use tetracarboxylic acid di-anhydrides, aliphatic dicarboxylic acids, and aromatic dicarboxylic acids, as needed.

Examples of the tetracarboxylic acid di-anhydrides include pyromellitic acid dianhydride, 3,3',4,4'-benzophenone tetracarboxylic acid dianhydride, 3,3',4,4'-biphenyl tetracarboxylic acid dianhydride, 3,3',4,4'-diphenylsulfone tetracarboxylic acid dianhydride, 1,2,5,6-naphthalene tetracarboxylic acid dianhydride, 2,3,5,6-pyridine tetracarboxylic acid dianhydride, 1,4,5,8-naphthalene tetracarboxylic acid dianhydride, 3,4,9,10-perylene tetracarboxylic acid dianhydride, 4,4'-sulfonyl diphthalic acid dianhydride, m-terphenyl-3,3',4,4'-tetracarboxylic acid dianhydride, 4,4'-oxy diphthalic acid dianhydride, 1,1,1,3,3,3-hexafluoro-2,2-bis(2,3- or 3,4-dicarboxy phenyl)propane dianhydride, 2,2-bis(2,3- or 3,4-dicarboxy phenyl)propane dianhydride, 2,2-bis[4-(2,3- or 3,4-dicarboxy phenoxy)phenyl]propane dianhydride, 1,1,1,3,3,3-hexafluoro-2,2-bis[4-(2,3- or 3,4-dicarboxy phenoxy) phenyl]propane dianhydride, 1,3-bis(3,4-dicarboxyphenyl)-1,1,3,3-tetramethyl disiloxane dianhydride, butane tetracarboxylic acid dianhydride and bicyclo-[2,2,2]-octo-7-en-2,3,5,6-tetracarboxylic acid dianhydride.

Examples of the aliphatic dicarboxylic acids include succinic acid, glutaric acid, adipic acid, azelaic acid, suberic acid, sebacic acid, decanoic diacid, dodecanoic diacid and dimer acid.

Examples of the aromatic dicarboxylic acids include isophthalic acid, terephthalic acid, phthalic acid, naphthalene dicarboxylic acid and oxy dibenzoic acid.

In the production of the thermosetting urethane resin, it is preferred to use a monohydroxyl compound as an end sealing agent, which is a compound containing one hydroxyl compound in its molecule, such as an aliphatic alcohol and a monohydroxymono(meth)acrylate compound. Herein, (meth)acrylate means acrylate and/or methacrylate, and this is applied also hereinafter.

Examples of the aliphatic alcohol are methanol, ethanol, propanol, isobutanol, and an example of the monohydroxy mono(meth)acrylate compound is 2-hydroxyethyl acrylate.

By using these compounds, isocyanate group does not remain in the thermosetting urethane resin.

In order to add flame retardance, a halogen such as chlorine or bromine, and an atom such as phosphorus may be introduced to the structure of the thermosetting urethane resin.

In the reaction between the carbonate diol compound and the isocyanate compound, the reaction excluding preparing the acid-anhydride-group-containing thermosetting urethane resin, the molar ratio is preferably 50:100 to 150:100, more preferably 80:100 to 120:100.

In particular, in the case of preparing the carboxyl-group-containing thermosetting urethane resin by reacting the carboxyl-group-containing polyol together with the carbonate diol compound and the isocyanate compound, the mole number of the carbonate diol compound represented by (a), the mole number of the isocyanate compound represented by (b) and the mole number of the carboxyl-group-containing polyol represented by (c) satisfy the following blend proportion, (a)+(c):(b)=50:100 to 150:100, preferably (a)+(c):(b) =80:100 to 120:100.

In the reaction between the polyol compound containing the carbonate diol compound and the isocyanate compound, preferably usable solvents are nitrogen free polar solvents such as an ether solvent, a sulfur-containing solvent, an ester solvent, a ketone solvent and an aromatic hydrocarbon solvent.

For example, examples of the ether solvent are diethyleneglycol dimethylether, diethylene glycol diethylether, triethyleneglycol dimethylether and triethyleneglycol diethylether.

Examples of the sulfur-containing solvent are dimethylsulfoxide, diethyl sulfoxide, dimethyl sulfone and sulfolane.

Examples of the ester solvent are γ-butylolactone, diethylene glycol monomethylether acetate, ethylene glycol monomethylether acetate, propylene glycol monomethylether acetate, diethylene glycol monoethyl ether acetate, ethylene glycol monoethyl ether acetate and propylene glycol monoethylether acetate.

Examples of the ketone solvent are cyclohexanone and methylethyl ketone.

Examples of the aromatic hydrocarbon solvent are toluene, xylene and petroleum naphtha.

These may be used singly or two or more may be combined for use.

Among these, preferable examples of the solvent having high volatility and capable of giving low temperature curing properties are γ-butylolactone, diethylene glycol monomethylether acetate, ethylene glycol monomethylether acetate, propylene glycol monomethylether acetate, diethylene glycol monoethylether acetate, ethylene glycol monoethylether acetate and propylene glycol monoethyl ether acetate.

In the reaction of the polyol compound containing the carbonate diol compound and the isocyanate compound, the reaction temperature is preferably 30 to 180° C., more preferably 50 to 160° C. If the reaction temperature is lower than 30° C., the reaction takes too much time, and if the reaction temperature is over 180° C., gelation easily takes place.

The reaction time, which depends on the reaction temperature, is preferably 2 to 36 hr, more preferably 8 to 16 hr. The reaction time of less than 2 hr makes it difficult to control in order to prepare a desired number average molecular weight even if the reaction temperature is increased, and the reaction time exceeding 36 hr is not practical.

The thermosetting urethane resin has a number average molecular weight of preferably 500 to 100,000, more preferably 8,000 to 50,000. The number average molecular weight is a value converted to polystyrene measured by a gel permeation chromatography. If the thermosetting urethane resin has a number average molecular weight of less than 500, a cured film may have impaired elongation, flexibility and strength, and if the thermosetting urethane resin has a number average molecular weight exceeding 100,000, a cured film may become rigid and have lowered flexibility.

The carboxyl-group-containing thermosetting urethane resin has an acid value of preferably 5 to 150 mgKOH/g, more preferably 30 to 120 mgKOH/g. If the acid value is less than 5 mgKOH/g, the reactivity with the curing components is lowered, and then desired heat resistance and long time reliability may not be obtained. If the acid value is more than 150 mgKOH/g, the flexibility is easily spoiled and properties such as the long time insulating property may be lowered. The acid value of the resin is a value determined in accordance with JIS K5407.

The mass occupancy of the binder (B) is a value obtained by subtracting the mass occupancies of the component (A), the component (C) and optionally added other components from an entire discharge gap filling composition, and is preferably 30% by mass to 60% by mass in the entire discharge gap filling composition.

Layered Substance (C)

The discharge gap filling composition of the present invention preferably further comprises the layered substance (C) in view of attaining good protection properties from ESD.

The layered substance (C) is a substance formed from a plurality of layers combined through van der Waals force, and into a specific position within a crystal of the layered substance (C), an atom, molecule or ion not inherently concerned with the structure of the crystal can be incorporated by ion exchange etc, but the incorporation does not change the crystal structure. The position incorporating an atom, molecule or ion i.e., a host position, has a planar layer structure. Typical examples of the layered substance (C) are a layered clay mineral (C1), a layered carbon (C2) such as graphite, and a transition metal chalcogenide compound. These compounds exhibit unique properties by incorporating a metal atom, an inorganic molecule or an organic molecule as a guest into their host positions.

The layered substance (C) is characterized in that the distance between the layers flexibly corresponds with the size and the interaction of the guests. Compounds obtainable by incorporating the guests into the host positions are called intercalation compounds, and an extremely wide variety of intercalation compounds are produced by the combination of hosts and guests. Since guests present between the layers are under peculiar environment where they are constrained by the host layers from the two directions, the guests present between the layers have different properties from those of guests adsorbed on the surface of the layers. It is therefore considered that the properties of the intercalation compounds are dependent not only on the structures and properties of individual hosts and guests, but also on the host-guest interaction. Moreover, recent study of the layered substances has focused on the properties that layered substances well absorb electromagnetic wave and layered substances wherein guests are oxides serve as oxygen absorbing/releasing materials capable of absorbing or releasing oxygen at a certain temperature. The layered substance (C) having such properties is considered to interact with the hydrolyzed product of the metal alkoxide or with the self oxide film, thereby providing the discharge gap filling composition comprising the layered substance (C) with much improved protection properties from ESD.

The layered substance (C) used in the present invention is preferably at least one selected from the group consisting of a layered clay mineral (C1) and a layered carbon (C2).

As the layered substance (C) used in the present invention, examples of the layered clay mineral (C1) include smectites clay, which is a swelling silicate, and swelling mica.

Specific examples of the smectites clay are montmorillonite, beidellite, nontronite, saponite, ferrous saponite, hectorite, sauconite, stevensite and bentonite, and their substituents and derivatives, and mixtures thereof.

Specific examples of the swelling mica are lithium type taeniolite, sodium type taeniolite, lithium type tetrasilicic mica and sodium type tetrasilicic mica, and their substituents and derivatives, and mixtures thereof. Some of the swelling micas have a structure similar to that of vermiculite and it is also possible to use such vermiculite equivalents.

The layered substance (C) is preferably the layered carbon (C2). The layered carbon (C2) can release free electrons into the space between the electrodes at ESD occurrence. The use of the layered carbon (C2) tends to improve the operating property at ESD occurrence.

Examples of the layered carbon (C2) are a substance obtainable by treating cokes at a low temperature, carbon black, a metal carbide, carbon whisker and SiC whisker. It is confirmed that these layered carbons (C2) have operating property against ESD. Since these layered carbons (C2) have a carbon atom hexagonal network basic structure, a relatively small number of layers and a relatively low regularity, they tend to somewhat cause short circuit.

Therefore, preferable examples of the layered carbon (C2) are carbon nanotube, gas phase grown carbon fiber, carbon fullerene, graphite and a carbyne carbon because they have more regularity in lamination.

Among the layered carbon (C2), examples of fibrous ones are carbon nanotube, graphite whisker, filamentous carbon, graphite fiber, superfine carbon tube, carbon tube, carbon fibril, carbon micro tube and carbon nano fiber.

Moreover, these layered carbons (C2) may be mixed with an artificial diamond for use.

In particular, as the graphite, those having high lamination regularity are preferred with examples thereof including a hexagonal crystal graphite which is a hexagonal plate-like flat crystal, and the trigonal or rhomb face crystal graphites. As the carbyne carbon, preferable are those having a structure such that carbon atoms form a straight chain, and the carbon atoms are bonded with a single bond and a triple bond arranged alternately or the carbon atoms are bonded with a double bond.

Such graphites and carbyne carbon are suitable as a catalyst promoting the oxidation and the reduction of the metal powders (A) because of their ability to easily intercalate other atoms, ions or molecules between the layers: namely, the examples of the layered carbon (C2) cited herein are characterized by their ability to intercalate any of an electron donor and an electron acceptor.

The layered carbon (C2), in order to remove impurities therefrom, may be previously treated at a high temperature of about 2500 to 3200° C. in an inert gas atmosphere or at a high temperature of about 2500 to 3200° C. in an inert gas atmosphere together with a graphitizing catalyst such as boron, boron carbide, beryllium, aluminum or silicon.

As the layered substance (C), the layered clay mineral (C1) such as swelling silicate and swelling mica, and the layered carbon (C2) may be individually used or two or more may be combined for use. Among them, smectites clay, graphite and gas phase grown carbon fiber are preferably used because of having dispersibility in the binder component (B) and easy availability.

The layered substance (C) having a spherical or scale form has an average particle diameter of preferably 0.01 μm to 30 μm. The layered substance (C) having an average particle diameter of more than 30 μm, particularly in the case of the layered carbon (C2), easily induces conduction between particles, possibly leading to the difficulty to prepare a stable ESD protector. On the other hand, the layered substance (C) having an average particle diameter of less than 0.01 μm has high cohesive force and may cause production problems such as high charging properties.

In the case of the layered substance (C) having a spherical or scale form, the average particle diameter is evaluated using a 50% cumulative mass diameter obtained in the following measurement: 50 mg of a sample is weighed and added to 50 mL of distilled water, and then, 0.2 mL of a 2% Triton aqueous solution (product name, a surface active agent manufactured by GE Health Care Bio Science Co. Ltd.) was added to the mixture and dispersed with an ultrasonic homogenizer of a 150 W output for 3 min, and then measured with a leaser diffraction type particle size distribution meter, for example, leaser diffraction light scattering type particle size distribution meter (Trade Mark: Microtrac HRA, manufactured by Nikkiso Co., Ltd.), thereby obtaining a 50% cumulative mass diameter.

In the case of the layered substance (C) having a fibrous form, in a preferable embodiment, the outer diameter of the average fiber diameter is 0.01 μm to 0.3 μm, and the average fiber length is 0.01 μm to 20 μm; and in a more preferable embodiment, the outer diameter of the average fiber diameter is 0.06 μm to 0.2 μm, and the average fiber length is 1 μm to 20 μm. The outer diameter of the average fiber diameter and the average fiber length of the fibrous layered substance (C) can be calculated by measuring 10 fibers with an electron microscope and taking an average.

In the present invention, the addition of the layered substance (C) is not necessarily required. When the layered substance (C) is added and has a spherical or scale form, the mass occupancy of the layered substance (C) is preferably 0.1% by mass to 10% by mass, more preferably 1% by mass to 10% by mass, still more preferably 2% by mass to 5% by mass, in the solid components of the discharge gap filling composition. The mass occupancy of more than 10% by mass easily induces conduction between the layered substances (C) and increases heat reserve at ESD occurrence, leading to the tendency to break a resin or a base material. Further, after ESD occurrence, the high temperature tends to postpone the ESD protector recovering the insulating property. On the other hand, the mass occupancy of less than 0.1% by mass makes it difficult to obtain the effect resulting of the addition.

The layered substance (C), when having a fibrous form, is more effectively contact with the surfaces of the metal powders as compared with when having a spherical or scale form, and thus easily induces conduction if the mass occupancy is too large. Therefore, as compared with when having a spherical or scale form, the layered substance (C) having a fibrous form preferably has a smaller mass occupancy, preferably 0.01% by mass to 5% by mass, more preferably 0.1% by mass to 5% by mass, still more preferably 1% by mass to 5% by mass.

Other Components

The discharge gap filling composition of the present invention optionally comprises a curing catalyst, a curing accelerating agent, a filler, a solvent, a foaming agent, a defoaming agent, a leveling agent, a lubricant, a plasticizer, a rust preventive, a viscosity regulator and a colorant in addition to the metal powders (A), the binder component (B) and the layered substance (C). Moreover, the discharge gap filling composition of the present invention may comprise insulating particles such as silica particles.

Production Process of Discharge Gap Filling Composition

The discharge gap filling composition of the present invention can be produced, for example, by dispersing and mixing the metal powders (A) wherein the surfaces of the primary particles are coated with the film composed of the metal oxide and the binder component (B), and further optionally the layered substance (C) and other components such as a solvent, a filler and a curing catalyst, using a disper, a kneader, a three-roll mill, a bead mill or an autorotation type stirrer. The mixing may be carried out with the temperature increased to a sufficient temperature in order to attain favorable compatibility. The dispersing and mixing may be optionally followed by adding a curing accelerating agent and mixing.

<Electrostatic Discharge Protector>

The electrostatic discharge protector of the present invention comprises at least two electrodes and a discharge gap between the two electrodes, and comprises a discharge gap filling member formed by filling the discharge gap with the discharge gap filling composition as described above.

The two electrodes are disposed in a predetermined distance. The distance between the two electrodes is a discharge gap. The discharge gap filling member is formed in this discharge gap. That is to say, the two electrodes are connected to each other through the discharge gap filling member. The discharge gap filling member is formed from the discharge gap filling composition as described above.

The electrostatic discharge protector of the present invention is used as a protective circuit for releasing over-current to earth in order to protect a device at electrostatic discharge.

The electrostatic discharge protector of the present invention comprises the discharge gap filling member formed by filling the discharge gap with the discharge gap filling composition as described above, and thereby has excellent insulating property at normal operating, operating voltage and high voltage resistance. Specifically, at a low voltage at normal operating, the electrostatic discharge protector of the present invention shows a high electric resistance value and can feed current into a device without releasing the current to earth. On the other hand, at electrostatic discharge occurrence, the electrostatic discharge protector of the present invention immediately shows a low electric resistance value, and can release over-current to earth and prevent the over-current from being fed into the device. Upon the dissolution of the transient phenomenon of electrostatic discharge, the electrostatic discharge protector of the present invention recovers a high electric resistance value and can feed current to the device.

In the electrostatic discharge protector of the present invention, the discharge gap filling composition containing the insulating binder component (B) fills the discharge gap formed between the two electrodes, and thereby leakage current is not generated at normal operating. The electrostatic discharge protector of the present invention can have a resistance value of not less than $10^{10}\Omega$, for example, when a voltage of not more than DC10V is applied between the two electrodes, thereby realizing protection from electrostatic discharge.

The electrostatic discharge protector of the present invention can be produced by forming the discharge gap filling member through the use of the discharge gap filling composition in the following manner.

First, the discharge gap filling composition is prepared by the above-described process, and then the discharge gap filling composition is applied so as to cover the space between the two electrodes which forms the discharge gap, by means of potting, screen printing etc., and solidified or cured optionally through heating to thereby form the discharge gap filling member.

The discharge gap distance is preferably not more than 500 µm, more preferably 5 µm to 300 µm. If the discharge gap distance is over 500 µm, the electrostatic discharge protector may operate by increasing the width of the electrodes forming the discharge gap; however, the discharge gap distance being over 500 µm is not preferable because of easily causing unevenness between individual products of electrostatic discharge performance and moving back from the tendency toward a smaller size electrostatic discharge protector. The discharge gap distance being less than 5 µm is also not preferable because of easily causing unevenness between individual products of electrostatic discharge performance and causing short circuit due to the influence of the dispersion of the metal powders (A) and the layered substance (C). Herein, the discharge gap distance means the shortest distance between the electrodes.

A preferable form of the electrode of the electrostatic discharge protector can be set arbitrarily in accordance with the conditions of a circuit board. In consideration of downsizing, as a form, there can be mentioned a film having a rectangular cross section and having a thickness of, for example, 5 to 200 µm.

A preferable width of the electrode of the electrostatic discharge protector is not less than 5 µm, and an electrode with a larger width is preferable because of the ability to diffuse energy at electrostatic discharge. On the other hand, an electrostatic discharge protector comprising an electrode having a sharp shape and having a width of less than 5 µM is not preferable, because energy is concentrated at electrostatic discharge, and this considerably damages periphery members including the electrostatic discharge protector itself.

In the electrostatic discharge protector of the present invention, a protective layer is preferably formed on the surface of the discharge gap filling member.

With respect to the discharge gap filling composition as described above, there may be cases such as its insufficient adhesion to a base on which the discharge gap is provided depending on a material of the base, electrostatic discharge of very high energy, and high mass occupancy of the metal powders (A) wherein the primary particles are coated.

Even in cases like these, by forming the discharge gap filling member and then providing the protective layer such as a resin composition, described later, so as to cover this discharge gap filling member, the electrostatic discharge protector of the present invention can be provided with higher voltage resistance and can retain excellent repeating resistance.

Examples of the resin used as the protective layer are a natural resin, a modified resin and an oligomer synthetic resin.

As the natural resin, rosin is a typical resin. Examples of the modified resin are a rosin derivative and a rubber derivative. Examples of the oligomer synthetic resin include silicon resin, and further include such resins as used with a polysiloxane compound of the electrostatic discharge protector, e.g., an epoxy resin, an acrylic resin, a maleic acid derivative, a polyester resin, a melamine resin, a urethane resin, an imide resin, an amic acid resin, an imide/amide resin.

As the protective layer, a resin composition can be used.

The resin composition preferably contains a curable resin capable of being cured by heat or an ultraviolet ray in order to keep the strength of the coated film.

Examples of the thermosetting resin are a carboxyl-group-containing polyurethane resin, an epoxy compound, a combination of an epoxy compound with a compound containing an acid anhydride group, a carboxyl group, an alcoholic group or an amino group, and a combination of a carbodiimide-containing compound with a compound containing a carboxyl group, an alcoholic group or an amino group.

Examples of the epoxy compound are epoxy compounds having two or more epoxy groups in one molecule, such as a bisphenol A type epoxy resin, a hydrogenated bisphenol A type epoxy resin, a brominated bisphenol A type epoxy resin, a bisphenol F type epoxy resin, a novolac type epoxy resin, a phenol novolac type epoxy resin, a cresol novolac type epoxy resin, an alicyclic epoxy resin, a N-glycydyl type epoxy resin, a bisphenol A novolac type epoxy resin, a chelate type epoxy resin, a glyoxal type epoxy resin, an amino group-containing epoxy resin, a rubber modified epoxy resin, a dicyclopentadiene phenolic type epoxy resin, a silicon modified epoxy resin and a ε-caprolactone modified epoxy resin.

In order to give flame resistance, an epoxy compound having a structure into which an atom such as chlorine and bromine, or an atom such as phosphorus is introduced may be used. Furthermore, it is possible to use a bisphenol S type epoxy resin, a diglycidyl phthalate resin, a heterocyclic epoxy resin, a bixylenol type epoxy resin, a biphenol type epoxy resin and a tetraglycidyl xylenoyl ethane resin.

Examples of the ultraviolet ray curable resin are an acrylic copolymer which is a compound containing two or more ethylenic unsaturated groups, an epoxy(meth)acrylate resin and a urethane (meth)acrylate resin.

The resin composition for forming the protective layer can optionally contain a curing accelerating agent, a filler, a solvent, a foaming agent, a defoaming agent, a leveling agent, a lubricant, a plasticizer, an anticorrosive agent, a viscosity regulating agent, a colorant and like.

The thickness of the protective layer, although not particularly limited, is preferably 0.1 µm to 1 mm. Further, it is preferred that the protective layer completely covers the discharge gap filling member formed from the discharge gap filling composition. If the protective layer has a defect, a crack is more likely to be generated by high energy at electrostatic discharge.

FIG. 1 is a longitudinal cross section of an electrostatic discharge protector 11, which is one embodiment of the electrostatic discharge protector of the present invention. The electrostatic discharge protector 11 is formed from an electrode 12A, an electrode 12B and a discharge gap filling member 13. The electrode 12A and electrode 12B are disposed so that their axial directions are identical and their head surfaces face each other. A discharge gap 14 is formed between the head surfaces of the electrodes 12A and 12B faced each other. The discharge gap filling member 13 is formed in the discharge gap 14 so as to cover the head surface of the electrode 12A faced to the head surface of the electrode 12B and the head surface of the electrode 12B faced to the head surface of the electrode 12A from the upper side and to contact with the head surfaces. The width of the discharge gap 14, namely the distance between the head surfaces of the electrodes 12A and 12B faced each other is preferably 5 µm to 300 µm.

Figure 2:
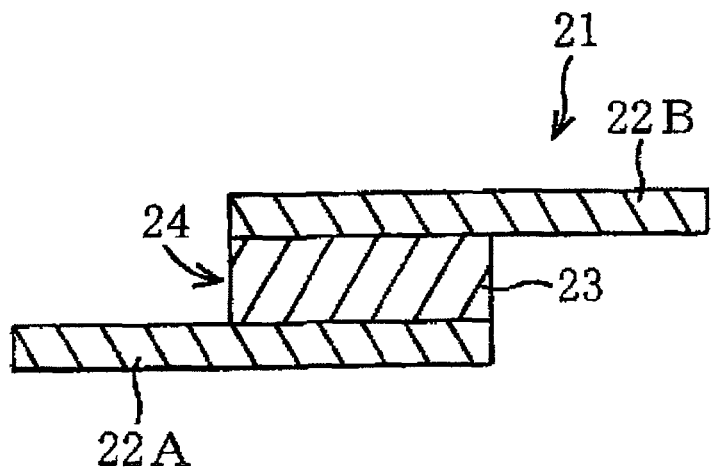
FIG. 2 is a vertical section of an electrostatic discharge protector 21, which is one embodiment of the electrostatic discharge protector according to the present invention.

FIG. 2 is a longitudinal cross section of an electrostatic discharge protector 21, which is another embodiment of the electrostatic discharge protector of the present invention. The electrostatic discharge protector 21 is formed from an electrode 22A, an electrode 22B and a discharge gap filling member 23. The electrode 22A and electrode 22B are parallel disposed so that they are piled up in their head parts in the vertical direction. A discharge gap 24 is formed on the part where the electrodes 22A and 22B are piled up in the vertical direction. The discharge gap filling member 23 has a rectangle cross-section and is formed in the discharge gap 24. The width of the discharge gap 24, namely distance between the electrodes 22A and 22B in the part where the electrodes 22A and 22B are piled up in the vertical direction is preferably 5 µm to 300 µm.

Figure 3:
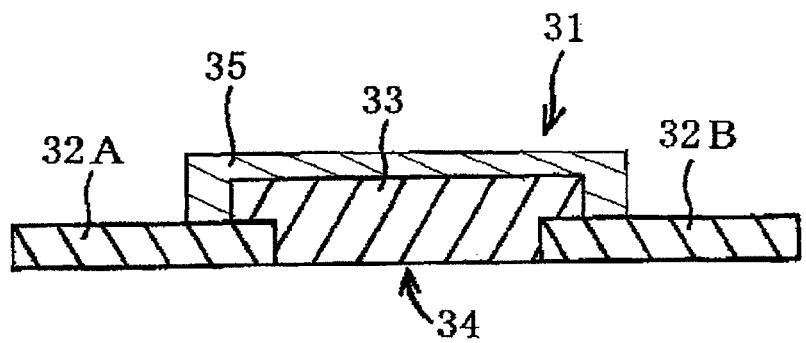
FIG. 3 is a vertical section of an electrostatic discharge protector 31, which is one embodiment of the electrostatic discharge protector according to the present invention.

FIG. 3 is a longitudinal cross section of an electrostatic discharge protector 31, which is one embodiment of the electrostatic discharge protector of the present invention. The electrostatic discharge protector 31 is formed on a base material made of, e.g., a polyimide film, and is formed from an electrode 32A, an electrode 32B, a discharge gap filling member 33 and a protective layer 35. The electrode 32A and electrode 32B are disposed so that their axial directions are identical and their head surfaces face each other. A discharge gap 34 is formed between the head surfaces of the electrodes 32A and 32B faced each other. The discharge gap filling member 33 is formed in the discharge gap 34 so as to cover the head surface of the electrode 32A faced to the head surface of the electrode 32B and the head surface of the electrode 32B faced to the head surface of the electrode 32A from the upper side and to contact with the head surfaces. The width of the discharge gap 34, namely the distance between the head surfaces of the electrodes 32A and 32B faced each other is preferably 5 µm to 300 µm.

Use

An electronic circuit board of the present invention comprises the electrostatic discharge protector as described above. Thus, the electronic circuit board of the present invention, even when subjected to electrostatic discharge, tends to hardly receive breakage by static electricity.

A flexible electronic circuit board of the present invention comprises the electrostatic discharge protector as described above. Thus, the flexible electronic circuit board of the present invention, even when subjected to electrostatic discharge, tends to hardly receive breakage by static electricity.

An electronic device of the present invention comprises the electronic circuit board as described above or the flexible electronic circuit board as described above. Thus, the electronic device of the present invention, even when subjected to electrostatic discharge, tends to hardly receive breakage by static electricity.

EXAMPLE

The present invention will be described in more detail with reference to the following examples, but the present invention should not be limited by them.

The individual properties of the electrostatic discharge protectors obtained in Examples were evaluated by the following methods.

<Evaluation Method for Insulating Property at Normal Operating Voltage>

Concerning electrode parts provided in both ends of the electrostatic discharge protector, the resistance at application of DC10V was measured using an insulation resistance meter "MEGOHMNETER SM-8220" (manufactured by DKK-TOA CORPORATION) and was taken as a "resistance at normal operating". From a value thus measured, the insulating property at normal operating voltage of the electrostatic discharge protector was evaluated under the following criteria.

(Criteria)

A: The electric resistance value is not less than $10^{10}\Omega$.
B: The electric resistance value is less than $10^{10}\Omega$.

<Evaluation Method for Operating Voltage>

Using a semiconductor electrostatic tester ESS-6008 (manufactured by NOISE LABORATORY Inc.), at first, 100 V was applied to the electrostatic discharge protector obtained, and the application of a voltage was increased by 50 V, thereby carrying out current measurement. An applied voltage at which a discharged current flew was evaluated as "an operating voltage". If the initial application of 100 V resulted in the observation of the discharged current, the operating voltage was taken as 100 V.

<Evaluation Method for High Voltage Resistance>

The electrostatic discharge protector obtained was fixed to a semiconductor electrostatic tester ESS-6008 (manufactured by NOISE LABORATORY Inc.) and a 8 kV voltage was applied thereon 10 times, and then a resistance value in application of DC10V was measured using an insulation resistance meter MEGOHMMETER SM-8220. The resistance value was evaluated as high voltage resistance under the following criteria.

(Criteria)

A: The resistance value is not less than $10^{10}\Omega$.
B: The resistance value is not less than $10^{8}\Omega$ and less than $10^{10}\Omega$.
C: The resistance value is less than $10^{8}\Omega$.

<Preparation Example 1 of Surface Coated Metal Powders (A)>

As the primary particles of the metal powders (A), aluminum particles manufactured by Showa Aluminum Powder K.K. (product name: 2173, solid component: 65%) were used. The aluminum particles had a flake form.

The surfaces of the aluminum particles were coated with a film composed of a hydrolyzed product of a metal alkoxide as follows. As the metal alkoxide, tetraethoxysilane was used.

76 g of aluminum particles having a flake form manufactured by Showa Aluminum Powder K.K. (product name: 2173, solid component: 65%) was dispersed in 724 g of propylene glycol monomethylether to prepare a dispersion, and 169 g of ion exchange water and 32 g of 25% by mass ammonium water were added to the dispersion and stirred to prepare an aluminum powder slurry and the aluminum powder slurry was kept at 30° C.

Next, 13.2 g of tetraethoxy silane was diluted with 13.2 g of propylene glycol monomethylether and this diluted liquid was dropped to the aluminum powder slurry at a constant rate over 12 hr. With the progressing of the hydrolysis of the tetraethoxy silane, the aluminum particles were surface-coated with a hydrolysis product of tetraethoxy silane.

After the dropping, the stirring was continued for 12 hr, and the temperature was kept at 30° C. Thereafter, the aluminum powders wherein the surfaces of the aluminum particles were coated with the tetraethoxy silane hydrolysis product were washed with propylene glycol monomethyl ether three times, and then the solvent was scattered at 40° C. to prepare a paste containing propylene glycol monomethylether and water having an aluminum solid component of 41% by mass (hereinafter, also called "paste 1 containing aluminum powders").

For measuring the solid component, the paste extracted was dried at 120° C. for 1 hr to prepare a residue. The mass of the residue was divided by the mass of the undried paste to determine a solid component. The scattering of the solvent at 40° C. was finished by confirming that the solid component was 41% by mass.

Figure 4:
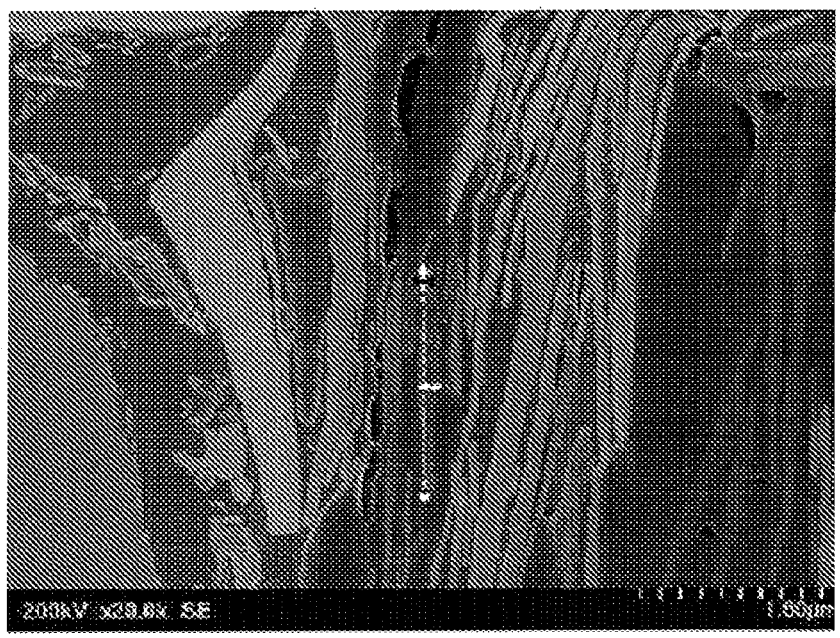
FIG. 4 is a scanning electron microscope (SEM) image of surface coated aluminum particles prepared in Preparation Example 1. The long span was measured in the direction indicated by a dotted arrow line, and the thickness was measured in the direction indicated by a solid arrow.

Further, cross sections of the aluminum particles surface-coated in Preparation Example 1 were formed, and the cross sections were observed with a scanning electron microscope (hereinafter, also referred to as "SEM") at a magnification of 20000. From the aluminum particles observed, arbitral ten particles were selected, and in each of the particles selected, the length of the longest axis (long side) "L" and the length of the shortest axis corresponding thereto "d" were measured. L and d in these ten particles were averaged, and from the average values, the aspect ratio (L/d) was determined and was found to be 20. An example of a SEM image employed in the measurement is shown in FIG. 4. The aluminum particles surface-coated in Preparation Example 1 were found to have a flake form.

<Preparation Example 2 of Surface Coated Metal Powders (A)>

As the primary particles of the metal powders (A), aluminum particles manufactured by Toyo Aluminum K.K. (product name: 08-0076, average particle diameter: 2.5 μm) were used. The aluminum particles had a spherical form.

The surfaces of the aluminum particles were coated with a film composed of a hydrolyzed product of a metal alkoxide as follows. As the metal alkoxide, tetraethoxysilane was used.

49 g of spherical aluminum particles manufactured by Toyo Aluminum K.K. (product name: 08-0076, average particle diameter: 2.5 μm) was dispersed in 724 g of propylene glycol monomethylether to prepare a dispersion, and 169 g of ion exchange water and 32 g of 25% by mass ammonium water were added to the dispersion and stirred to prepare an aluminum powder slurry and the aluminum powder slurry was kept at 30° C.

Next, 13.2 g of tetraethoxy silane was diluted with 13.2 g of propylene glycol monomethylether and this diluted liquid was dropped to the aluminum powder slurry at a constant rate over 12 hr. With the progressing of hydrolysis of the tetraethoxy silane, the aluminum particles were surface-coated with a hydrolysis product of tetraethoxy silane.

After the dropping, the stirring was continued for 12 hr, and the temperature was kept at 30° C. Thereafter, the aluminum particles wherein the surfaces of the aluminum particles were coated with the tetraethoxy silane hydrolysis product were washed with propylene glycol monomethyl ether three times and then the solvent was scattered at 40° C. to prepare a paste containing propylene glycol monomethylether and water having an aluminum solid component of 35% by mass (hereinafter, also called "paste 2 containing aluminum powders").

For measuring the solid component, the paste extracted was dried at 120° C. for 1 hr to prepare a residue. The mass of the residue was divided by the mass of the undried paste to determine a solid component. The scattering of the solvent at 40° C. was finished by confirming that the solid component was 35% by mass.

Figure 5:
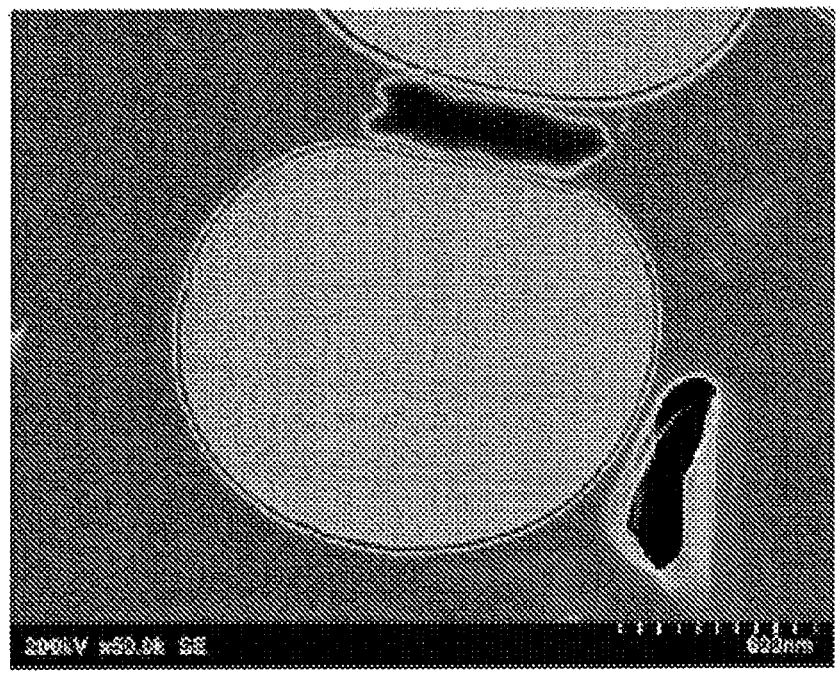
FIG. 5 is a scanning electron microscope (SEM) image of surface coated aluminum particles prepared in Preparation Example 2.

Cross sections of the aluminum particles surface-coated in Preparation Example 2 were formed, and the cross sections were observed with a scanning electron microscope (hereinafter, also referred to as "SEM") at a magnification of 50000. The aspect ratio (L/d) determined in the same manner as in Preparation Example 1 was 1.2. An example of a SEM image employed in the measurement is shown in FIG. 5. The aluminum particles surface-coated in Preparation Example 2 were found to have a spherical form.

<Synthetic Example 1 of Binder Component (B)>

As the binder component (B), a thermosetting urethane resin 1 was synthesized as follows.

To a reactor equipped with a stirrer, a thermometer and a condenser, 718.2 g of C-1015N (manufactured by Kuraray Co., Ltd., a polycarbonate diol having a raw material diol molar ratio of 1,9-nonane diol to 2-methyl-1,8-octane diol of 15:85, and a molecular weight of 964) as a polycarbonate diol, 136.6 g of 2,2-dimethylol butanoic acid (manufactured by Nippon Kasei Chemical Co., Ltd.) as a carboxyl-group-having dihydroxyl compound and 1293 g of diethylene glycol ethylether acetate (manufactured by Daicel Chemical Industries Ltd.) as a solvent were fed and all the raw materials were dissolved at 90° C.

The temperature of the liquid in which these raw materials were dissolved was decreased to 70° C. and 237.5 g of methylene bis(4-cyclohexyl isocyanate) (manufactured by Sumica Bayer Urethane Co., Ltd., product name "Desmodule-W") was dropped as a polyisocyanate to the solution over 30 min through a dropping funnel.

After the dropping, the reaction was carried out at 80° C. for 1 hr, at 90° C. for 1 hr and at 100° C. for 1.5 hr and then it was confirmed that an isocyanate was almost disappeared. Thereafter, 2.13 g of isobutanol (manufactured by Wako Pure Chemical Industries Ltd.) was dropped to the solution and reacted at 105° C. for 1 hr, thereby obtaining a carboxyl-group-containing urethane resin (hereinafter, also referred to as a "thermosetting urethane resin 1").

The resultant thermosetting urethane resin 1 had a number average molecular weight of 6090 and a solid component acid value of 40.0 mgKOH/g. This thermosetting urethane resin 1 was diluted by adding γ-butylolactone so that the solid component was 45% by mass, thereby obtaining a solution (hereinafter, also referred to as a "thermosetting urethane resin solution 1").

<Synthetic Example 2 of Binder Component (B)>

As the binder component (B), a thermosetting urethane resin 2 was synthesized as follows.

To a 5 L four-necked flask equipped with a stirrer, a cooling tube with an oil separator, a nitrogen introducing tube and a thermometer, 100.0 g (0.50 mol) of PLACCEL CD-220 (product name of 1,6-hexane diol polycarbonate diol manufactured by Daicel Chemical Industries, Ltd.), 250.27 g (1.00 mol) of 4,4'-diphenyl methane diisocyanate and 833.51 g of γ-butylolactone were fed and the temperature of the mixture was increased to 140° C. The mixture was reacted at 140° C. for 5 hr to prepare a second diisocyanate. Thereafter, to the reaction liquid, 288.20 g (1.50 mol) of anhydrous trimellitic acid as an anhydride-group-having polycarboxylic acid, 125.14 g (0.50 mol) of 4,4'-diphenylmethane diisocyanate and 1361.14 g of γ-butylolactone were fed and the temperature was increased to 160° C. and the mixture was reacted for 6 hr to prepare an acid-anhydride-group-having thermosetting urethane resin (hereinafter, also referred to as a "thermosetting urethane resin 2") having a number average molecular weight of 18,000. The resultant thermosetting urethane resin 2 was diluted with γ-butylolactone to prepare an amide imide resin solution having a viscosity of 160 Pa·s and a nonvolatile component content of 52% by weight, namely a solution of the thermosetting urethane resin 2 (hereinafter, also referred to as a "thermosetting urethane resin solution 2").

Example 1

<Preparation of Discharge Gap Filling Composition>

To 49 g of the paste 1 containing aluminum powders (solid component of 41% by mass) prepared in Preparation Example 1 and 1.0 g of "UF-G5" (artificial graphite fine powders, scale form, average particle diameter 3 μm, manufactured by Showa Denko K.K.) as the layered substance (C), 18.2 g of the thermosetting urethane resin solution 1 (solid component of 45% by mass) synthesized in Synthesis Example 1 and 0.63 g of an epoxy resin (JER604 manufactured by Japan Epoxy Resin Co., Ltd.) as a curing agent were added and stirred at 2000 rpm with a homogenizer for 15 min to prepare a discharge gap filling composition 1.

<Preparation of Electrostatic Discharge Protector and Evaluation>

An electrostatic discharge protector as shown in FIG. 3 was prepared as follows.

On a wiring base material in which a pair of electrode patterns having a film thickness of 12 μm, a discharge gap distance of 50 μm and an electrode width of 500 μm was formed on a polyimide film having a film thickness of 25 μm, the discharge gap filling composition 1 was applied using a flat needle having a tip diameter of 2 mm to fill the discharge gap so as to extend toward the electrode patterns. Thereafter, the wiring base material was kept in a constant temperature vessel at 120° C. for 60 min to form a discharge gap filling member. Thereafter, a silicon resin (product name: X14-B2334 manufactured by Momentive Inc.) was applied and completely coated on the electrostatic protector, and quickly put in a curing furnace at 120° C. and cured at 120° C. for 1 hr to form a protective film. Thus, an electrostatic discharge protector 1 was prepared. Regarding the electrostatic discharge protector 1 obtained, the insulating property at normal operating, the operating voltage and the high voltage resistance were evaluated. The results are shown in Table 1.

Example 2

<Preparation of Discharge Gap Filling Composition>

To 49 g of the paste 1 containing aluminum powders (solid component of 41% by mass) prepared in Preparation Example 1, 18.2 g of the thermosetting urethane resin solution 1 (solid component of 45% by mass) synthesized in Synthesis Example 1, and 0.63 g of an epoxy resin (JER604 manufactured by Japan Epoxy Resin Co., Ltd.) as a curing agent were added and stirred at 2000 rpm with a homogenizer for 15 min to prepare a discharge gap filling composition 2.

<Preparation of Electrostatic Discharge Protector and Evaluation>

An electrostatic discharge protector 2 was prepared in the same manner as in Example 1, except for using the discharge gap filling composition 2 instead of the discharge gap filling composition 1. Regarding the electrostatic discharge protector 2 obtained, the insulating property at normal operating, the operating voltage and the high voltage resistance were evaluated. The results are shown in Table 1.

Example 3

<Preparation of Discharge Gap Filling Composition>

To 49 g of the paste 1 containing aluminum powders (solid component of 41% by mass) prepared in Preparation Example 1 and 1.0 g of "UF-G5" (artificial graphite fine powders, scale form, average particle diameter 3 μm, manufactured by Showa Denko K.K.) as the layered substance (C), 15.8 g of the thermosetting urethane resin solution 2 (non-volatile component content of 52% by mass) synthesized in Synthesis Example 2 and 1.58 g of YH-434 (product name, amine type epoxy resin, epoxy equivalent weight of about 120, 4 epoxy groups/molecule manufactured by Thoto Kasei Co., Ltd.) as a curing agent were added and stirred at 2000 rpm with a homogenizer for 15 min to prepare a discharge gap filling composition 3.

<Preparation of Electrostatic Discharge Protector and Evaluation>

An electrostatic discharge protector 3 was prepared in the same manner as in Example 1, except for using the discharge gap filling composition 3 instead of the discharge gap filling composition 1. Regarding the electrostatic discharge protector 3 obtained, the insulating property at normal operating, the operating voltage and the high voltage resistance were evaluated. The results are shown in Table 1.

Example 4

<Preparation of Discharge Gap Filling Composition>

To 49 g of the paste 1 containing aluminum powders (solid component of 41% by mass) prepared in Preparation Example 1, 3.6 g of the thermosetting urethane resin solution 1 (solid component content of 45% by mass) synthesized in Synthesis Example 1 and 0.13 g of an epoxy resin (JER604 manufactured by Japan Epoxy Resin Co., Ltd.) as a curing agent were added and stirred at 2000 rpm with a homogenizer for 15 min to prepare a discharge gap filling composition 4.

<Preparation of Electrostatic Discharge Protector and Evaluation>

An electrostatic discharge protector 4 was prepared in the same manner as in Example 1, except for using the discharge gap filling composition 4 instead of the discharge gap filling composition 1. Regarding the electrostatic discharge protector 4 obtained, the insulating property at normal operating, the operating voltage and the high voltage resistance were evaluated. The results are shown in Table 1.

Comparative Example 1

<Preparation of Discharge Gap Filling Composition>

To 57 g of the paste 2 containing aluminum powders (solid component of 35% by mass) prepared in Preparation Example 2, 1.0 g of "UF-G5" (artificial graphite fine powders, scale form, average particle diameter 3 μm, manufactured by Showa Denko K.K.) as the layered substance (C) and 13 g of propylene glycol monomethylether, 18.2 g of the thermosetting urethane resin solution 1 (solid component of 45% by mass) synthesized in Synthesis Example 1 and 0.63 g of an epoxy resin (product name JER604, manufactured by Japan Epoxy Resin Co., Ltd.) as a curing agent were added and stirred at 2000 rpm with a homogenizer for 15 min to prepare a discharge gap filling composition 5.

<Preparation of Electrostatic Discharge Protector and Evaluation>

An electrostatic discharge protector 5 was prepared in the same manner as in Example 1, except for using the discharge gap filling composition 5 instead of the discharge gap filling composition 1. Regarding the electrostatic discharge protector 5 obtained, the insulating property at normal operating, the operating voltage and the high voltage resistance were evaluated. The results are shown in Table 1.

Comparative Example 2

<Preparation of Discharge Gap Filling Composition>

To 57 g of the paste 2 containing aluminum powders (solid component of 35% by mass) prepared in Preparation Example 2, and g of propylene glycol monomethylether, 18.2 g of the thermosetting urethane resin solution 1 (solid component of 45% by mass) synthesized in Synthesis Example 1 and 0.63 g of an epoxy resin (product name JER604, manufactured by Japan Epoxy Resin Co., Ltd.) as a curing agent were added and stirred at 2000 rpm with a homogenizer for 15 min to prepare a discharge gap filling composition 6.
<Preparation of Electrostatic Discharge Protector and Evaluation>
An electrostatic discharge protector 6 was prepared in the same manner as in Example 1, except for using the discharge gap filling composition 6 instead of the discharge gap filling composition 1. Regarding the electrostatic discharge protector 6 obtained, the insulating property at normal operating, the operating voltage and the high voltage resistance were evaluated. The results are shown in Table 1.

Comparative Example 3

<Preparation of Discharge Gap Filling Composition>
A discharge gap filling composition 7 was prepared in the same manner as in Example 1, except for using 20 g of spherical aluminum particles 08-0076 manufactured by Toyo Aluminum K.K. (average particle diameter: 2.5 μm) instead of the paste 1 containing aluminum powders prepared in Preparation Example 1.
<Preparation of Electrostatic Discharge Protector and Evaluation>
An electrostatic discharge protector 7 was prepared in the same manner as in Example 1, except for using the discharge gap filling composition 7 instead of the discharge gap filling composition 1. Regarding the electrostatic discharge protector 7 obtained, the insulating property at normal operating, the operating voltage and the high voltage resistance were evaluated. The results are shown in Table 1.

Comparative Example 4

<Preparation of Discharge Gap Filling Composition>
A discharge gap filling composition 8 was prepared in the same manner as in Example 1, except for using 31 g of aluminum particles manufactured by Showa Aluminum Powder K.K. (product name: 2173, solid component: 65%) instead of the paste 1 containing aluminum powders prepared in Preparation Example 1.
<Preparation of Electrostatic Discharge Protector and Evaluation>
An electrostatic discharge protector 8 was prepared in the same manner as in Example 1, except for using the discharge gap filling composition 8 instead of the discharge gap filling composition 1. Regarding the electrostatic discharge protector 8 obtained, the insulating property at normal operating was evaluated. As a result, it was found that the resistance value was less than $10^8 \Omega$, and thus the insulating property was not shown.
Thus, discharge experiments (evaluation of the operating voltage and the high voltage resistance) were not carried out. The results are shown in Table 1.

Comparative Example 5

To 31 g of the aluminum particles manufactured by Showa Aluminum Powder K.K. (product name: 2173, solid component: 65%) and 0.76 g of fumed silica (Cabosil M-5 manufactured by Cabot Co., Ltd.), 18.2 g of the thermosetting urethane resin solution 1 (solid component of 45% by mass) synthesized in Synthesis Example 1 and 0.63 g of an epoxy resin (JER604 manufactured by Japan Epoxy Resin Co., Ltd.) as a curing agent were added and stirred at 2000 rpm with a homogenizer for 15 min to prepare a discharge gap filling composition 9.

<Preparation of Electrostatic Discharge Protector and Evaluation>
An electrostatic discharge protector 9 was prepared in the same manner as in Example 1, except for using the discharge gap filling composition 9 instead of the discharge gap filling composition 1. Regarding the electrostatic discharge protector 9 obtained, the insulating property at normal operating was evaluated. As a result, it was found that the resistance value was less than $10^8 \Omega$, and thus the insulating property was not shown.
Thus, discharge experiments (evaluation of the operating voltage and the high voltage resistance) were not carried out. The results are shown in Table 1.

TABLE 1

| | Metal Powders (A) (% by mass) | Layered Compound (C) (% by mass) | Insulating property at normal operating | Operating voltage (V) | High voltage resistance |
|---|---|---|---|---|---|
| Ex. 1 | 67 | 3 | A | 250 | A |
| Ex. 2 | 70 | 0 | A | 250 | A |
| Ex. 3 | 65 | 3 | A | 250 | A |
| Ex. 4 | 92 | 0 | A | 200 | A |
| Com. Ex. 1 | 67 | 3 | A | 900 | A |
| Com. Ex. 2 | 70 | 0 | A | 1000 | A |
| Com. Ex. 3 | 67 | 3 | A | 200 | C |
| Com. Ex. 4 | 67 | 3 | B | Discharge test not performed | |
| Com. Ex. 5 | 67 | 0 | B | Discharge test not performed | |

In Table 1, % by mass indicates a ratio in all the solid components of the discharge gap filling composition. In Comparative Examples 1 to 5, the ratio of metal powders used instead of the metal powders (A) having their surfaces coated and having a flake form is indicated.

From the results shown in Table 1, it was found that the electrostatic discharge protectors using the discharge gap filling composition containing the metal powders (A) wherein the surfaces of the primary particles are coated with the film composed of the hydrolyzed product of the metal alkoxide and the primary particles have a flake form and the binder component (B) had excellent insulating property at normal operating, operating voltage and high voltage resistance (See Examples 1 to 3). In particular, it was found that the electrostatic discharge protectors obtained in Examples 1 to 3 had superior property in terms of the operating voltage compared with the electrostatic discharge protectors obtained in Comparative Examples 1 and 2. Specifically, when the surfaces of the primary particles are coated with the film composed of the hydrolyzed product of the metal alkoxide, the use of the metal powders wherein the primary particles have a flake form (Examples 1 to 3) results in the electrostatic discharge protector having superior operating voltage, compared with the use of the metal powders wherein the primary particles have a spherical form (Comparative Examples 1 and 2). Furthermore, it was found that the use of the metal powders wherein the primary particles have a higher aspect ratio (for example, 5 or more) results in the electrostatic discharge protector having superior properties, compared with the use of the metal powders wherein the primary particles have a lower aspect ratio.

From the result of Comparative Example 3, it was found that the use of the metal powders wherein the surfaces of the primary particles are not coated with the film composed of the hydrolyzed product of the metal alkoxide and the primary particles have a spherical form results in the electrostatic discharge protector having inferior high voltage resistance. From the result of Comparative Example 4, it was found that the use of the metal powders wherein the primary particles have a flake form, but the surfaces of the primary particles are not coated with the film composed of the hydrolyzed product of the metal alkoxide results in the electrostatic discharge protector having inferior properties such as insulating property at normal operating.

From the result of Comparative Example 5, it was found that the use of the mixture prepared by physically mixing the uncoated metal particles having a flake form and the fine powder metal oxide, without the surfaces of the primary particles being coated with the film composed of the hydrolyzed product of the metal alkoxide, results in the electrostatic discharge protector having inferior properties such as insulating property at normal operating.

POSSIBILITY OF INDUSTRIAL USE

By using the discharge gap filling composition comprising the metal powders (A) and the binder component (B), wherein the surfaces of the primary particles of the metal powders (A) are coated with the film composed of the metal oxide, and the primary particles have a flake form, an electrostatic discharge protector having excellent operating property and high degree of freedom can be obtained at a lower cost.

DESCRIPTION OF MARKS

11 . . . Electrostatic discharge protector
12A . . . Electrode
12B . . . Electrode
13 . . . Discharge gap filling member
14 . . . Discharge gap
21 . . . Electrostatic discharge protector
22A . . . Electrode
22B . . . Electrode
23 . . . Discharge gap filling member
24 . . . Discharge gap
31 . . . Electrostatic discharge protector
32A . . . Electrode
32B . . . Electrode
33 . . . Discharge gap filling member
34 . . . Discharge gap
35 . . . Protective layer

The invention claimed is:

1. A discharge gap filling composition comprising metal powders (A) and a binder component (B), wherein surfaces of primary particles of the metal powders (A) are coated with a film composed of a metal oxide which is a hydrolyzed product of a metal alkoxide represented by the following general formula (1) and the primary particles of the metal powders (A) have a flake form:

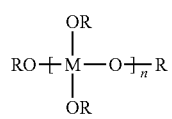

(1)

wherein in the formula (1), M is a metal atom, O is an oxygen atom, R are each independently an alkyl group of 1 to 20 carbon atoms, and n is an integer of 1 to 40.

2. The discharge gap filling composition according to claim 1, wherein M in the general formula (1) is silicon, titanium, zirconium, tantalum or hafnium.

3. The discharge gap filling composition according to claim 1, further comprising a layered substance (C).

4. The discharge gap filling composition according to claim 1, wherein the film composed of a metal oxide is a self oxide film formed from the primary particles per se of the metal powders (A).

5. The discharge gap filling composition according to claim 1, wherein a metal element of the metal powders (A) is manganese, niobium, zirconium, hafnium, tantalum, molybdenum, vanadium, nickel, cobalt, chromium, magnesium, titanium or aluminum.

6. The discharge gap filling composition according to clam 3, wherein the layered substance (C) is at least one selected from the group consisting of a layered clay mineral (C1) and a layered carbon (C2).

7. The discharge gap filling composition according to claim 3, wherein the layered substance (C) is a layered carbon (C2).

8. The discharge gap filling composition according to claim 7, wherein the layered carbon (C2) is at least one selected from the group consisting of carbon nanotube, gas phase grown carbon fiber, carbon fullerene, graphite and a carbyne carbon.

9. The discharge gap filling composition according to claim 1, wherein the binder component (B) comprises a thermosetting compound or an active energy curable compound.

10. The discharge gap filling composition according to claim 1, wherein the binder component (B) comprises a thermosetting urethane resin.

11. An electrostatic discharge protector comprising at least two electrodes, a discharge gap formed between the two electrodes, the electrostatic discharge protector further comprising a discharge gap filling member formed by filling the discharge gap with the discharge gap filling composition according to claim 1.

12. The electrostatic discharge protector according to claim 11, wherein the discharge gap has a distance of 5 to 300 μm.

13. The electrostatic discharge protector according to claim 11, wherein a protective layer is formed on a surface of the discharge gap filling member.

14. An electronic circuit board comprising the electrostatic discharge protector according to claim 11.

15. A flexible electronic circuit board comprising the electrostatic discharge protector according to claim 11.

16. An electronic device comprising the electronic circuit board according to claim 14.

17. An electronic device comprising the electronic circuit board according to claim 15.

* * * * *